Patented Jan. 3, 1950

2,492,956

UNITED STATES PATENT OFFICE 2,492,956

PREPARATION OF UNSATURATED HYDROCARBONS FROM UNSATURATED KETONES

Seaver A. Ballard, Oakland, Harry de V. Finch, El Cerrito, and Elbert A. Peterson, Berkeley, Calif., assignors to Shell Development Company, San Francisco, Calif., a corporation of Delaware No Drawing. Application October 1, 1946, Serial No. 700,368

13 Claims. (Cl. 260—666)

This invention relates to a process for the preparation of unsaturated hydrocarbons. More particularly, the present invention relates to a method for the direct synthesis of unsaturated hydrocarbons, preferably dienes which involves reaction of an unsaturated ketone containing at least six carbon atoms, with an alcohol in the vapor phase and in the presence of a metal oxide catalyst. The invention provides in particular a process for the production of dienes by the reaction of an unsaturated ketone containing at least six carbon atoms with a non-tertiary alcohol in the presence of a suitable hydrogen transfer-dehydration catalyst, to produce directly by such reaction dienes containing the same number of carbon atoms as the unsaturated ketone reactant.

The ketones which are employed in accordance with the present invention contain at least six carbon atoms, and an unsaturated linkage of aliphatic character between two carbon atoms one of which is directly attached to the carbon atom of the carbonyl group, and are capable of being brought into the vapor phase under the conditions of the process. The unsaturated linkage may be either olefinic in character or acetylenic in character. Particularly desirable results are obtained, however, when the unsaturated ketone is one that contains an olefinic bond in the alpha, beta-position relative to the carbonyl group, i. e., between two carbon atoms, one of which is directly attached to the carbon atom of the carbonyl group.

The unsaturated hydrocarbons that are formed by the practice of the process of the present invention contain the same number of carbon atoms as the unsaturated ketone that is employed as the ketonic reactant. The process of the invention thus is particularly suited to the preparation of dienes which contain at least six carbon atoms, from alpha,beta-unsaturated ketones which contain at least six carbon atoms. The alpha,beta-olefinically unsaturated ketones which thus may be employed may be characterized as having structures represented by the formula

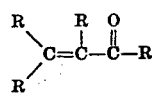

wherein each R represents an organic radical and the several R's are so selected that the molecule contains a linear group of at least four contiguous carbon atoms joined by aliphatic carbon-to-carbon bonds, including the carbonyl carbon atom, and so that the molecule contains at least six carbon atoms.

The unsaturated ketones which may be employed advantageously in the process of the present invention may be symmetrical or unsymmetrical and may be either acyclic or alicyclic, or they may contain one or more aromatic groups. However, particularly advantageous results are realized when an acyclic monoölefinic or an alicyclic monoölefinic ketone is employed. Representative of the acyclic monoölefinic ketones which may be employed are, for example, mesityl oxide, homomesityl oxide, isopropyl isopropenyl ketone, butyl isopropenyl ketone, isobutyl isopropenyl ketone, ethyl isopropenyl ketone, and homologous and analogous ketones of the present class. Monoölefinic ketones containing a cyclic group which may be used effectively as the carbonylic reactant include, for example, 3,5,5-trimethyl-2-cyclohexen-1-one(isophorone), 2-cyclohexen-1-one, 2-methyl-2-cyclopenten-1-one, 3-ethyl-2-cyclohexen-1-one, 2,3-dimethyl-2-cyclohexen-1-one, 2-isopropylidene-1-cyclohexanone, 2-isobutylidene-3-methyl-1-cyclohexanone, 1-acetyl-1-cyclohexene, 1-acetyl-2-methyl-1-cyclohexene, and homologous and analogous unsaturated ketones. Ketones such as diisopropenyl ketone, allyl vinyl ketone, 4-isopropenyl-2-cyclohexen-1-one, 3-isopropenyl-4-ethyl-2-cyclohexen-1-one, and other unsaturated ketones of the present class but containing more than one olefinic bond may be employed, if desired, to provide unsaturated hydrocarbons containing more than two olefinic bonds.

The unsaturated ketones which may be utilized in the process of the present invention may contain more than one carbonyl group, as in diketones, and ketoaldehydes. They also may contain additional substituent groups provided such additional substituent groups are not of a kind/or in a position in the molecule to interfere with the successful practice of the process of the invention. Substituent groups or atoms such as halogen, nitro, amino, cyano, ether linkages, etc. are among the additional substituent groups which may be present.

Although a wide variety of unsaturated ketones thus may be employed in accordance with the present invention, it is preferred to employ an acyclic monoölefinic or an alicyclic monoölefinic ketone, containing no aromatic groups and not more than one carbonyl group. Particularly advantageous results are obtained in the matter of yield, etc., when isophorone, mesityl oxide or homomesityl oxide is employed as the carbonylic reactant.

In accordance with the present invention, a ketone of the aforesaid class is reacted with a non-tertiary saturated alcohol which contains at least one alcoholic hydroxy group or with a non-tertiary unsaturated alcohol which contains at least one alcoholic hydroxy group. Suitable non-tertiary alcohols adapted to use in the reaction are the saturated lower aliphatic alcohols such as ethyl alcohol, propyl alcohol, isopropyl alcohol, the primary and secondary butyl alcohols, and homologous non-tertiary alcohols that may be volatilized under the conditions of reaction. Instead of such saturated lower aliphatic alcohols there may be employed unsaturated lower aliphatic alcohols which may be brought into the vapor phase under the conditions of reaction, representative examples of which are allyl alcohol, methyl vinyl carbinol, and the like. Non-tertiary alcohols containing a cyclic grouping also may be used in accordance with the present invention. Thus, there by be employed, if desired, non-tertiary, cyclic alcohols such as benzyl alcohol, diphenyl carbinol, benzyl carbinol, cyclohexanol, and the like and their homologues. It will be seen that the alcohols which may be employed have at least one hydrogen atom bonded to the carbon atom to which the hydroxyl group is linked. Although any of the aforementioned alcohols may be employed in the process of this invention, it has been found to be particularly advantageous to employ the saturated aliphatic monohydric alcohols containing not more than four carbon atoms, such as ethyl alcohol, the propyl alcohols and primary or secondary butyl alcohol. Particularly high yields of dienes are obtained when isopropyl alcohol is employed in the process of the invention.

The process of the present invention comprises reacting the non-tertiary alcohol with the unsaturated ketone in the vapor phase in the presence of a catalyst comprising one or more metal oxides. In our copending application Serial No. 633,860, we have disclosed a process for reacting alpha, beta-unsaturated aldehydes or ketones with non-tertiary alcohols, in the vapor phase in the presence of a catalyst comprising one or more metal oxides. The present process has as its objective the synthesis of unsaturated hydrocarbons, particularly dienes, from a reaction mixture comprising an unsaturated ketone containing at least six carbon atoms and a non-tertiary alcohol, by reaction of the ketone and the non-tertiary alcohol under conditions which lead to the formation of a reaction product which contains substantial proportions of dienes, as principal products of the reaction.

Suitable catalysts that may be employed in practicing the present invention are catalysts that have hydrogen transfer-dehydration activity and that contain at least one oxide of a polyvalent metal. Single oxides or mixtures of two or more oxides may be employed as catalysts.

A desirable type of catalyst thus is one which contains aluminum oxide, either singly or with one or more additional metal oxides having catalytic properties. Alternatively there may be employed as catalyst in the present process one or more oxides of elements selected from the second group of the periodic table, either alone or in conjunction with other metal oxides having catalytic hydrogen transfer-dehydration activity under the reaction conditions employed. If desired, inert or catalytically active materials may be employed as a support for the catalyst.

The alumina that may be employed in accordance with the invention preferably is an activated alumina, i. e., an adsorptive alumina, which consists predominantly of alumina alpha monohydrate and/or gamma alumina. The alumina catalysts that are characterized by their active adsorptive characteristics may be obtained from natural sources or they may be prepared synthetically. For example, an efficient and inexpensive activated alumina may be prepared by treatment of natural bauxite ore, such as the activated bauxite sold in the trade by the Porocel Corporation under the trade name "Porocel," or by the treatment of adsorptive aluminas having the general physical and chemical characteristics of Porocel. The synthetic activated aluminas suitable for use in accordance with the process of the present invention may be prepared from gels which may be peptized or unpeptized, or, preferably, they may be prepared from crystalline material such as crystalline alpha alumina trihydrate crystallized from alkali aluminate solutions. Methods of preparing activated alumina are known and will be apparent to those skilled in the art.

A particularly desirable catalyst for use in the present process comprises a mixture of alumina and a second metal oxide such as chromium oxide; for example as may be obtained by impregnating activated alumina with a solution of chromic acid, and heating the thus impregnated alumina at an elevated temperature. The alumina may or may not contain some other suitable substance, e. g., there may be employed an activated alumina containing lesser amounts of ferric oxide, etc. It has been found that the chromium oxide-alumina catalyst is of particular value in the present process because it provides a desirably high yield of dienes and enables the use of conditions which minimize possible undesired side reactions or decompositions, and its use therefore generally is preferred.

Instead of the alumina impregnated with chromium oxide there may be employed as catalyst in accordance with the present invention, an activated alumina impregnated with boria, with iron oxide, with copper oxide, and the like. A catalyst comprising an activated alumina and another metal oxide which may or may not be in chemical combination with the activated alumina on the surface thereof, may be prepared by direct impregnation of the activated alumina with a solution of the desired compound, or in other cases, by other means; for example, by impregnation of the alumina with one compound followed by a conversion treatment whereby the impregnating compound is converted to the compound desired in the final catalyst.

Other metal oxide catalysts which may be employed advantageously in accordance with the process of the present invention comprise the oxides of the metals in the second group of the periodic table, either singly or in combination, or in combination with a material having suitable hydrogen transfer-dehydration activity within the range of temperature and other conditions employed. Thus, for example, there may be employed as catalyst in the present process, magnesium oxide alone, a catalyst composed of calcium oxide and zinc oxide, or beryllium oxide and zinc oxide, or zinc oxide and alumina, and the like. It frequently is desirable to employ a catalyst containing an alkaline earth metal oxide, i. e., an oxide of a metal of the main group of the second group of the periodic table, combined, if desired, with a suitable catalytic material such as, for instance, copper, iron, hematite, iron oxide, alumina, zinc oxide, thoria, chromium oxide, and the like. When a mixture of two or more substances comprise the catalyst, the substances may in general be present in any proportions. Particularly satisfactory results may be obtained, however, through use in the present process of catalysts containing from about 10% to about 20% of zinc oxide on alumina, from about 5% to about 25%, preferably from about 15% to about 20% of chromium oxide on alumina, or about 10% zinc oxide and about 1% calcium oxide on alumina.

The catalyst may be in the form of a fine powder, in the form of pellets or other formed pieces of suitable size, or it may be in the form of fragments of suitable size. The catalyst, singly or in combination, may be used with or without active or inert supports such as pumice, silica gel, alumina, activated charcoal, kieselguhr, etc. Thus, in some cases the oxide or oxides may be ball milled with water and the mixture filtered to a stiff paste and extruded in the form of cylinders of the desired size, which may be dried by heating prior to use. Alternatively, the catalyst if too fragile after extrusion to be packed in the catalyst tube, may be formed by pilling. Other means of obtaining the catalyst in the desired physical form will be apparent to those skilled in the art.

The conditions that favor the formation of dienes from the present reaction mixtures have been found to depend to a certain extent upon the particular catalyst that is used, the carbonyl compound that is employed as the carbonyl reactant, the choice of non-tertiary alcohol and the like. The process is effected in accordance with the invention under conditions which promote simultaneous hydrogen transfer and dehydration reactions in the existing reaction mixture but which do not promote excessive side reaction, decomposition, or similar possible undesired reactions.

The process of the invention is effected by contacting a gaseous mixture comprising the unsaturated ketone of the hereinbefore defined class and the non-tertiary alcohol with a suitable catalyst of the hereinbefore mentioned type, under correlated conditions of temperature, reaction time, proportions of reactants, etc., which promote substantial hydrogen transfer-dehydration reaction in the reaction mixture. Since in accordance with the invention the reaction is effected with the reactants in the vapor phase, the temperature of reaction should be sufficiently high to maintain the reaction mixture in the gaseous state, but not so high that excessive decomposition of the organic materials present or excessive side reaction, etc., occurs. Generally speaking, temperatures of from about 200° C. to about 400° C. are effective. Within this range, temperatures between about 230° C. and about 350° C. are generally preferable. Catalysts comprising alumina, such as catalysts comprising alumina and chromium oxide, or alumina and zinc oxide, generally may be employed most effectively at temperatures of from about 250° C. to about 325° C., although somewhat higher or lower temperatures may at times be suitable. On the other hand, catalysts comprising magnesia as the major component generally are most effective in promoting the reaction provided by the present invention, when somewhat higher temperatures are employed, say from about 275° C. to about 350° C. or higher.

It usually is preferred to employ approximately atmospheric pressures for the reaction for reasons of convenience, although pressures either somewhat above or below atmospheric have not been found to be detrimental to the process.

Any suitable apparatus may be used and the reaction may be carried out in continuous, batch, or intermittent manner, although it frequently is particularly convenient to carry out the reaction in a continuous manner, for example by vaporizing the liquid reactants, passing the vapors over the catalyst which is contained in a suitable heated container, and condensing the condensable material in the product in cooled traps. If desired, the product thus obtained may be subjected to fractional distillation. The relative proportions of unsaturated ketone and non-tertiary alcohol in the reaction mixture may be varied widely. However, it generally is desirable to provide a molar excess of the non-tertiary alcohol. It thus generally is desirable to employ a molar ratio of alcohol to the unsaturated ketone of from about 2:1 to about 12:1. Particularly effective results are obtained at molar ratios of about 4:1 to about 11:1.

It has been found that in most cases relatively low flow rates are desirable for accomplishing the objectives of the invention. The term "flow rate" as used herein may be defined as the total number of moles of the reactants contacted with 100 cc. of catalyst per minute. The flow rate to be employed in any particular case depends upon the activity of the particular catalyst, the non-tertiary alcohol that is employed, the particular carbonyl compound that is used, and upon the other conditions of operation. For each alcohol and carbonyl compound of the present class, and for each selected catalyst, the temperature and flow rate can be so regulated and correlated that practical conversion of the unsaturated ketone to dienes may be obtained while substantially obviating the occurrence of undesired side reactions. A flow rate of about 0.02 to about 0.10 total moles of reactants per 100 cc. of catalyst per minute is suitable in most cases. More preferably there is employed a flow rate of about 0.035 to about 0.08 total moles of reactants per 100 cc. of catalyst per minute, whereas optimum results frequently are obtained by the use of a flow rate of from about 0.04 to about 0.06 total moles of reactants per 100 cc. of catalyst per minute, particularly when the temperature of reaction is maintained within the range of from about 230° C. to 350° C. and a catalyst comprising chromium oxide and alumina or zinc oxide and alumina is employed.

It is desirable to conduct the process in the absence of any added water. Likewise, the addition of hydrogen is not necessary or desired for accomplishing the objects of the invention. In the reaction between the alcohol and the carbonyl compound to form dienes, it appears that the alcohol and the carbonyl compound may react by means of a bimolecular exchange of hydrogen to form (1) unsaturated alkanols derived from the unsaturated ketone and (2) the aldehyde or ketone corresponding to the alcohol employed. No change in the arrangement of the carbon atoms in the reactants is thought to occur. Since the dienes provided by the present process contain the same number of carbon atoms as the unsaturated ketone, it is clear that reactions such as condensation reactions, addition reactions, etc., leading to an increase in the size of the carbon skeleton, also are avoided. It appears that each molecule of the alkanol thus formed loses one molecule of water under the reaction conditions to form the final diene products of reaction. The substances employed as catalysts in the present process thus appear to be, and may be defined as, substances capable of acting as hydrogen exchange-dehydration catalysts under the reaction conditions that are employed.

It is believed that the chemical reactions occurring during the process of the invention may be represented by the following general equations:

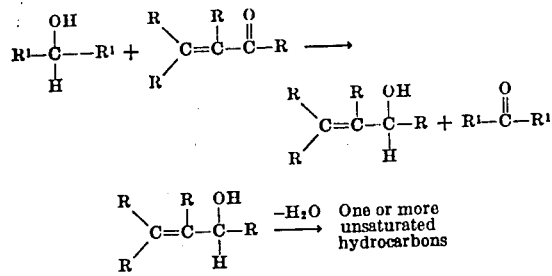

In the equations, $R^1$ signifies the hydrogen or organic radicals of the non-tertiary alcohol, and R has its previous significance. The several R's, as stated previously, are so selected that the carbonylic compound contains a linear chain of at least four contiguous carbon atoms bonded by aliphatic carbon-to-carbon bonds, including the carbon atom of the carbonyl group. The hydrocarbon radicals which $R^1$ may represent are preferably saturated or aromatic, i. e., not readily hydrogenatable, such as the alkyl, cycloalkyl, aryl, alkaryl, and aralkyl radicals. $R^1$ is more preferably a hydrogen atom or an alkyl radical.

If effected in a continuous manner, the process may be interrupted at any convenient time to permit regeneration of the catalyst, for example by burning with air to remove carbon and organic material which may have accumulated, or by any other suitable procedure. The reactivation or regeneration of the catalyst preferably is effected without removing the catalyst from the reaction tube or chamber. The reactivation is readily accomplished by passing air or some other gaseous material containing free oxygen into contact with the catalyst at an elevated temperature, if desired in the presence of an added inert gaseous material such as steam, carbon dioxide, nitrogen, etc. For example, a mixture of air and steam is in some cases suitable. During the reactivation, the temperature of the catalyst mass is maintained preferably at from about 350° C. to about 900° C. When a catalyst such as a magnesia-zinc oxide catalyst or chrome-alumina catalyst is regenerated, it is sometimes preferable to burn the catalyst with air at a peak temperature of about 480° C. When air is used as the oxidizing agent, it may be passed through the catalyst mass at an appropriate rate, usually at a space velocity of from about 150 to about 1600. The term "space velocity" as used herein may be defined as the number of units of volume of gaseous material, measured at 0° C. and a pressure of 760 mm. of mercury, contacted with a unit volume of catalyst per hour. Temperatures greater than about 900° C. are usually to be avoided since they may cause undesired changes in the physical structure of the catalyst and permanently affect its activity. The time of treatment necessary to restore the catalyst activity will depend upon various factors such as the conditions of the reactivation treatment and the amount of carbon and/or organic material to be oxidized. The reactivation, in many cases, can be effected in one or two hours. The process period of the catalysts may vary; in practice, the catalysts have been used successfully for continuous runs of about 7 hours between reactivation periods. It has been found that the catalysts may be reactivated repeatedly without impairing their efficiency in the present process.

The product that is obtained in accordance with the process of the present invention comprises in general a mixture of one or more unsaturated isomeric hydrocarbons that contain one more olefinic bond but the same number of carbon atoms as the unsaturated aldehyde or ketone that was employed as the carbonylic compound together with any possible unreacted carbonylic compound and/or non-tertiary alcohol. When a monoolefinic unsaturated ketone of the herein defined class is employed, there is obtained a mixture comprising one or more unsaturated dienes that contain the same number of carbon atoms as the ketone. The formation of a plurality of isomeric hydrocarbons from one unsaturated ketone appears to be due to a possible isomerizing influence of the catalyst under the conditions of reaction which leads to shifts in the positions of the double bonds in the hydrocarbon products of reaction. It will be appreciated that use herein without further qualification, of the term "a diene" is intended to include such mixtures of isomeric dienes formed by isomerization reaction, or otherwise. After separation of the products of reaction from any unreacted reactants, products of side reaction, etc., the unsaturated hydrocarbons, if more than one is present, may be separated in any suitable way such as by fractional distillation when applicable, or by chemical means that are known to the art for effecting separation of isomeric unsaturated hydrocarbons. Such separation of a mixture of isomers, if one is formed by the process of the present invention, does not constitute a necessary part of the present process and it will be appreciated that the process may be utilized advantageously whether or not eventual separation of isomers from each other is desired.

The following examples will serve to illustrate certain embodiments of the process of the invention. In the following experiments, about 100 cc. of the catalyst in the form of cylinders of about ⅛ inch diameter were packed into a steel tube having an inside diameter of about ⅝ inch and a heating length of about 24 inches and having a ¼ inch thermocouple exceeding coaxially down the center of the reaction tube. The liquid feed components were vaporized separately or together and passed in admixture through the catalyst tube under about atmospheric pressure and at the stated flow rates. The catalyst was maintained at the desired range of temperature by external heating of the reaction tube.

*Example I*

The catalyst was prepared by impregnating 100 grams of activated alumina with an aqueous solution of 34 grams of chromic acid. The impregnated alumina was dried and heated in air at 400° C.

Isopropyl alcohol and mesityl oxide were vaporized and passed together at a molar ratio of 6:1 and at a flow rate of 0.049 total moles of reactants per 100 cc. catalyst per minute, over the catalyst heated to a temperature of 271° C. Seventy-five per cent of the mesityl oxide feed was converted to methylpentadienes.

*Example II*

The catalyst was prepared by impregnating 200 grams of activated alumina with an aqueous solution of 73 grams of zinc nitrate hexahydrate. The impregnated alumina was dried and the zinc nitrate was decomposed by heating the impregnated alumina in air at 400° C.

Isopropyl alcohol and mesityl oxide were vaporized and passed together in a molar ratio of 6:1 and at a flow rate of 0.049 total moles of reactants per 100 cc. catalyst per minute, over the catalyst heated to a temperature of 240° C. Forty-nine per cent of the mesityl oxide feed was converted to methylpentadienes.

*Example III*

The catalyst was prepared by grinding in a ball mill for about 16 hours 200 grams of magnesium oxide and 1600 cc. of water. The ground mixture was filtered until a stiff paste was obtained. The paste was extruded in the form of cylinders having a diameter of about ⅛ inch, and then dried at 125° C. to 150° C.

Isopropyl alcohol and mesityl oxide were passed in the vapor phase at a molar ratio of 6:1 and at a flow rate of 0.049 total moles of reactants per 100 cc. catalyst per minute, over the catalyst heated to a temperature of 460° C. Fifty-two per cent of the mesityl oxide feed was converted to methylpentadienes.

*Example IV*

Isophorone and ethyl alcohol were vaporized and passed together in a molar ratio of 1:4 and at a flow rate of 0.05 total moles of reactants per 100 cc. catalyst per minute, over a catalyst prepared as in Example I maintained at about 300° C. Trimethylcyclohexadienes were recovered from the products of reaction in a conversion of 28 per cent based on the isophorone fed and a yield of 72 per cent based on the isophorone consumed.

*Example V*

Isopropyl alcohol and mesityl oxide were vaporized and passed at a molar ratio of 6.1:1 and at a flow rate of 0.073 total moles of reactants per 100 cc. catalyst per minute, over a catalyst containing 10% zinc oxide and 1% calcium oxide on activated alumina at a temperature of about 370° C. Sixty per cent of the mesityl oxide feed was converted to methylpentadienes.

*Example VI*

Isopropyl alcohol and mesityl oxide in the vapor phase were passed at a molar ratio of 10.2:1 and at a flow rate of 0.51 total moles reactants per 100 cc. catalysts per minute, over a catalyst containing 15% chromium oxide on activated alumina at a temperature of 270° C. Eighty-one per cent of the mesityl oxide feed was converted to methylpentadienes.

*Example VII*

Isophorone and isopropyl alcohol were reacted as in Example IV. Trimethylcyclohexadiene was recovered from the products of reaction in a conversion corresponding to 92 per cent of the isophorone fed.

*Example VIII*

The foregoing Example VI was repeated, using a flow rate of 0.049 total moles of reactants per 100 cc. of catalyst per minute, a molar ratio of alcohol to mesityl oxide of 10.4:1 and a reaction temperature of 253° C. Seventy-eight per cent of the mesityl oxide feed was converted to methylpentadienes.

*Example IX*

Isopropyl alcohol and mesityl oxide in a molar ratio of 6.2:1 were passed at a flow rate of 0.049 mole per 100 cc. catalyst per minute, over a catalyst containing 8% cobalt oxide on activated alumina heated to 250° C. Conversion of mesityl oxide feed to methylpentadienes was 66%.

*Example X*

Methyl isopropenyl ketone and isopropyl alcohol were reacted under the conditions employed in Example IV. Isoprene was recovered from the products of reaction in a conversion corresponding to 10% of the methyl isopropenyl ketone.

*Example XI*

Alpha-ethyl-beta-propyl acrolein and isopropyl alcohol were reacted under the conditions of Example IV. Ethylhexadienes were recovered from the products of reaction in conversion of 25 per cent based on the alpha-ethyl,beta-propylacrolein fed.

*Example XII*

Homomesityl oxide (5 - methyl - 4 - hepten - 3 - one) and secondary butyl alcohol were reacted according to Example IV. Fifty-three per cent of the homomesityl oxide fed was converted to octadienes.

This application is a continuation-in-part of our copending application Serial No. 669,110 filed May 11, 1946, now abandoned, which in turn is a continuation-in-part of our prior copending application Serial No. 633,860, filed December 8, 1945.

We claim as our invention:

1. In a process for the preparation of an octadiene by interaction of isopropyl alcohol and homomesityl oxide, passing a gaseous mixture comprising isopropyl alcohol and homomesityl oxide in a molar ratio of from about 2:1 to about 12:1 into contact with a catalyst comprising an adsorptive alumina comprising predominantly a member of the group consisting of alumina alpha monohydrate, gamma alumina, and mixtures thereof, and chromium oxide at a temperature from about 250° C. to about 325° C., and recovering an octadiene from the products of reaction.

2. In a process for the preparation of an octadiene by interaction of a non-tertiary lower aliphatic alcohol and homomesityl oxide, passing a gaseous mixture comprising a non-tertiary lower aliphatic alcohol and homomesityl oxide in a molar ratio of from about 2:1 to about 12:1 into contact with a catalyst comprising an adsorptive alumina comprising predominantly a member of the group consisting of alumina alpha monohydrate, gamma alumina, and mixtures thereof, and chromium oxide at a temperature from about 200° C. to about 400° C. and recovering an octadiene from the products of reaction.

3. In a process for the preparation of a trimethylcyclohexadiene by interaction of isopropyl alcohol and isophorone, passing a gaseous mixture comprising isopropyl alcohol and isophorone in a molar ratio of from about 2:1 to about 12:1 into contact with a catalyst comprising an adsorptive alumina comprising predominantly a member of the group consisting of alumina alpha monohydrate, gamma alumina, and mixtures thereof, and chromium oxide at a temperature from about 250° C. to about 325° C., and recovering a trimethylcyclohexadiene from the products of reaction.

4. In a process for the preparation of a trimethylcyclohexadiene by interaction of a non-tertiary lower aliphatic alcohol and isophorone, passing a gaseous mixture comprising a non-tertiary lower aliphatic alcohol and isophorone in a molar ratio of from about 2:1 to about 12:1 into contact with a catalyst comprising an adsorptive alumina comprising predominantly a member of the group consisting of alumina alpha monohydrate, gamma alumina, and mixtures thereof, and chromium oxide at a temperature from about 200° C. to about 400° C., and recovering a trimethylcyclohexadiene from the products of reaction.

5. In a process for the preparation of a methylpentadiene by interaction of isopropyl alcohol and mesityl oxide, passing a gaseous mixture comprising isopropyl alcohol and mesityl oxide in a molar ratio of from about 2:1 to about 12:1 into contact with a catalyst comprising an adsorptive alumina comprising predominantly a member of the group consisting of alumina alpha monohydrate, gamma alumina, and mixtures thereof, and chromium oxide at a temperature from about 250° C. to about 325° C., and recovering a methylpentadiene from the products of reaction.

6. In a process for the preparation of a methylpentadiene by interaction of a non-tertiary lower aliphatic alcohol and mesityl oxide, passing a gaseous mixture comprising a non-tertiary alcohol and mesityl oxide in a molar ratio of from about 2:1 to about 12:1 into contact with a catalyst comprising an adsorptive alumina comprising predominantly a member of the group consisting of alumina alpha monohydrate, gamma alumina, and mixtures thereof, and chromium oxide at a temperature from about 200° C. to about 400° C. and recovering a methylpentadiene from the reaction products.

7. In a process for the preparation of a diene by interaction of a non-tertiary alcohol and an alpha,beta-olefinic non-aromatic ketone containing at least six carbon atoms, contacting at a temperature of from about 200° C. to about 400° C. a gaseous mixture comprising a non-tertiary lower aliphatic alcohol and an alpha,beta-olefinic non-aromatic ketone containing at least six carbon atoms and having a linear group of at least four contiguous carbon atoms including the carbon atom of the carbonyl group in a molar ratio of from about 2:1 to about 12:1 with a catalyst comprising chromium oxide deposited on an adsorptive alumina comprising predominantly a member of the group consisting of alumina alpha monohydrate, gamma alumina, and mixtures thereof, and recovering a diene from the products of reaction.

8. In a process for the preparation of a diene by interaction of a non-tertiary alcohol and an alpha,beta-olefinic non-aromatic ketone containing at least six carbon atoms, contacting at a temperature of from about 200° C. to about 400° C. a gaseous mixture comprising an alpha,beta-olefinic non-aromatic ketone containing at least six carbon atoms and having a linear group of at least four contiguous carbon atoms including the carbon atom of the carbonyl group and a molar excess thereover of a non-tertiary alcohol with a catalyst comprising chromium oxide deposited on an adsorptive alumina comprising predominantly a member of the group consisting of alumina alpha monohydrate, gamma alumina, and mixtures thereof, and recovering a diene from the products of reaction.

9. In a process for the preparation of diene, contacting at a temperature of from about 200° C. to about 400° C. a gaseous mixture comprising an alcohol having at least one hydrogen atom bonded to the carbon atom to which the hydroxyl group is linked and an alpha,beta-olefinic non-aromatic ketone containing at least six carbon atoms and having a linear group of at least four contiguous carbon atoms including the carbon atom of the carbonyl group in a molar ratio from about 2:1 to about 12:1 with a catalyst comprising an adsorptive alumina comprising predominantly a member of the group consisting of alumina alpha monohydrate, gamma alumina, and mixtures thereof, and chromium oxide and recovering a diene from the products of reaction.

10. In a process for the preparation of a diene by interaction of a non-tertiary alcohol and an alpha,beta-olefinic non-aromatic ketone containing at least six carbon atoms, contacting at a temperature of from about 200° C. to about 400° C. a gaseous mixture comprising a non-tertiary alcohol containing not more than four carbon atoms and an alpha,beta-olefinic non-aromatic ketone containing at least six carbon atoms and having a linear group of at least four contiguous carbon atoms including the carbon atom of the carbonyl group, the alcohol being present in molar excess over the ketone, with a catalyst comprising an adsorptive alumina comprising predominantly a member of the group consisting of alumina alpha monohydrate, gamma alumina, and mixtures thereof, and an oxide of a second polyvalent metal selected from the group consisting of cobalt and chromium deposited thereon, and recovering a diene from the products of reaction.

11. In a continuous process for the production of a diene by interaction of a non-tertiary alcohol and an alpha,beta-olefinic non-aromatic ketone containing at least six carbon atoms, passing a stream of a gaseous mixture comprising a saturated aliphatic monohydric non-tertiary alcohol containing not more than four carbon atoms and an alpha,beta-olefinic non-aromatic ketone containing at least six carbon atoms and having a linear group of at least four contiguous carbon atoms including the carbon atom of the carbonyl group, the alcohol being present in molar excess over the ketone, into contact with a catalyst comprising an adsorptive alumina comprising predominantly a member of the group consisting of alumina alpha monohydrate, gamma alumina, and mixtures thereof, and an oxide of a second polyvalent metal selected from the group consisting of cobalt and chromium at a temperature of from about 200° C. to about 400° C. at a flow rate of from about 0.02 to about 0.10 total moles of the reactants per 100 cc. of catalyst per minute, and recovering a diene from the products of reaction.

12. In a continuous process for the production of a diene by interaction of a non-tertiary alcohol and an alpha,beta-olefinic non-aromatic ketone containing at least six carbon atoms, passing a stream of a gaseous mixture comprising a saturated aliphatic monohydric non-tertiary alcohol containing not more than four carbon atoms and an alpha,beta-olefinic non-aromatic ketone containing at least six carbon atoms and having a linear group of at least four contiguous carbon atoms including the carbon atom of the carbonyl group, the alcohol being present in molar excess over the ketone, into contact with a catalyst comprising an adsorptive alumina comprising predominantly a member of the group consisting of alumina alpha monohydrate, gamma alumina, and mixtures thereof, and chromium oxide at a temperature of from about 200° C. to about 400° C. at a flow rate of from about 0.02 to about 0.10 total moles of the reactants per 100 cc. catalyst per minute, and recovering a diene from the products of reaction.

13. In a process for the preparation of a diene by interaction of a non-tertiary alcohol and an alpha,beta-olefinic non-aromatic ketone containing at least six carbon atoms, passing a gaseous mixture comprising an alcohol having at least one hydrogen atom bonded to the carbon atom to which the hydroxyl group is linked and an alpha,beta-olefinic non-aromatic ketone containing at least six carbon atoms and having a linear group of at least four contiguous carbon atoms including the carbon atom of the carbonyl group into contact at a temperature of from about 200° C. to about 400° C. with a catalyst comprising an adsorptive alumina comprising predominantly a member of the group consisting of alumina alpha monohydrate, gamma alumina, and mixtures thereof, and an oxide of a second polyvalent metal selected from the group consisting of cobalt and chromium.

SEAVER A. BALLARD.
HARRY DE V. FINCH.
ELBERT A. PETERSON.

REFERENCES CITED

The following references are of record in the file of this patent:

UNITED STATES PATENTS

| Number | Name | Date |
| --- | --- | --- |
| 1,682,919 | Maximoff | Sept. 4, 1928 |
| 2,204,978 | Bartlett | June 18, 1940 |
| 2,407,291 | Quattlebaum, Jr. | Sept. 10, 1946 |
| 2,421,361 | Toussaint et al. | May 27, 1947 |

FOREIGN PATENTS

| Number | Country | Date |
| --- | --- | --- |
| 538,353 | Great Britain | July 31, 1941 |